April 9, 1957 A. A. VON SNEIDERN 2,788,033
AUTOMATICALLY ADJUSTABLE GANG SAW
Filed Dec. 28, 1954 3 Sheets-Sheet 3
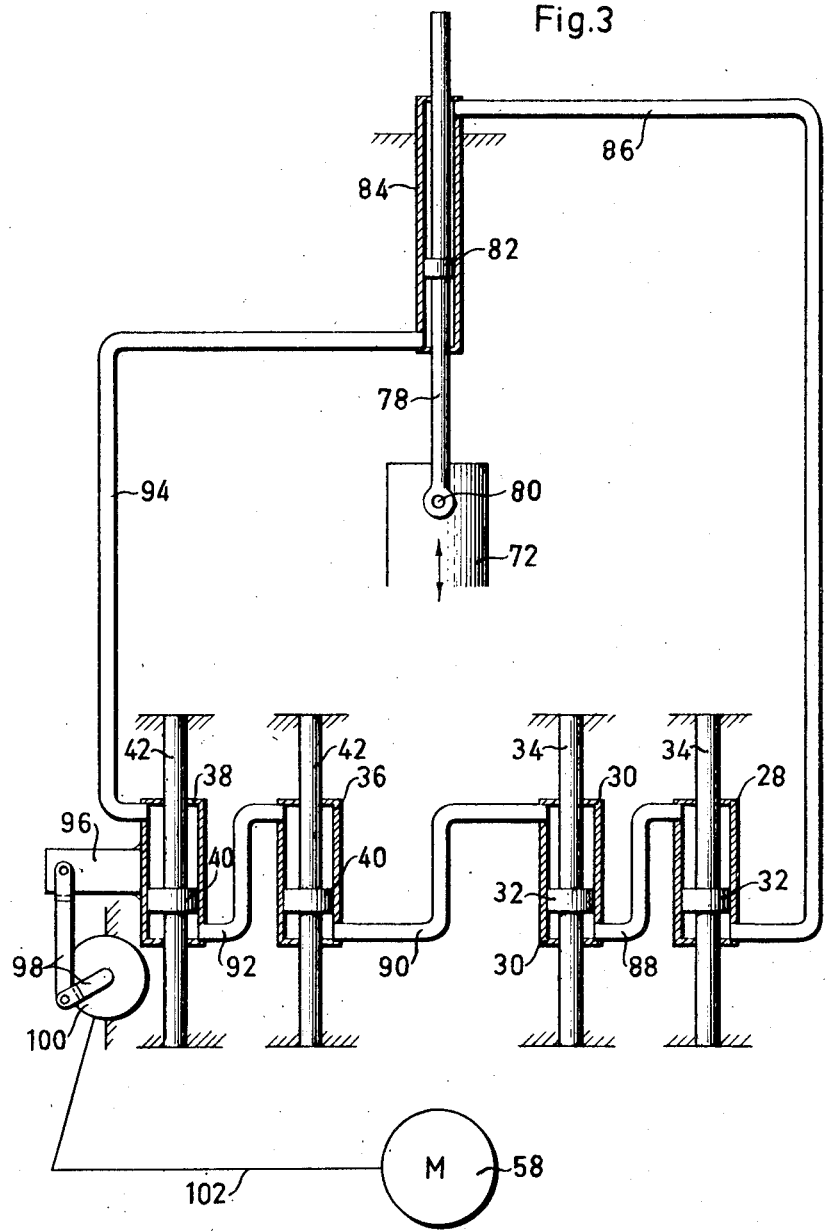

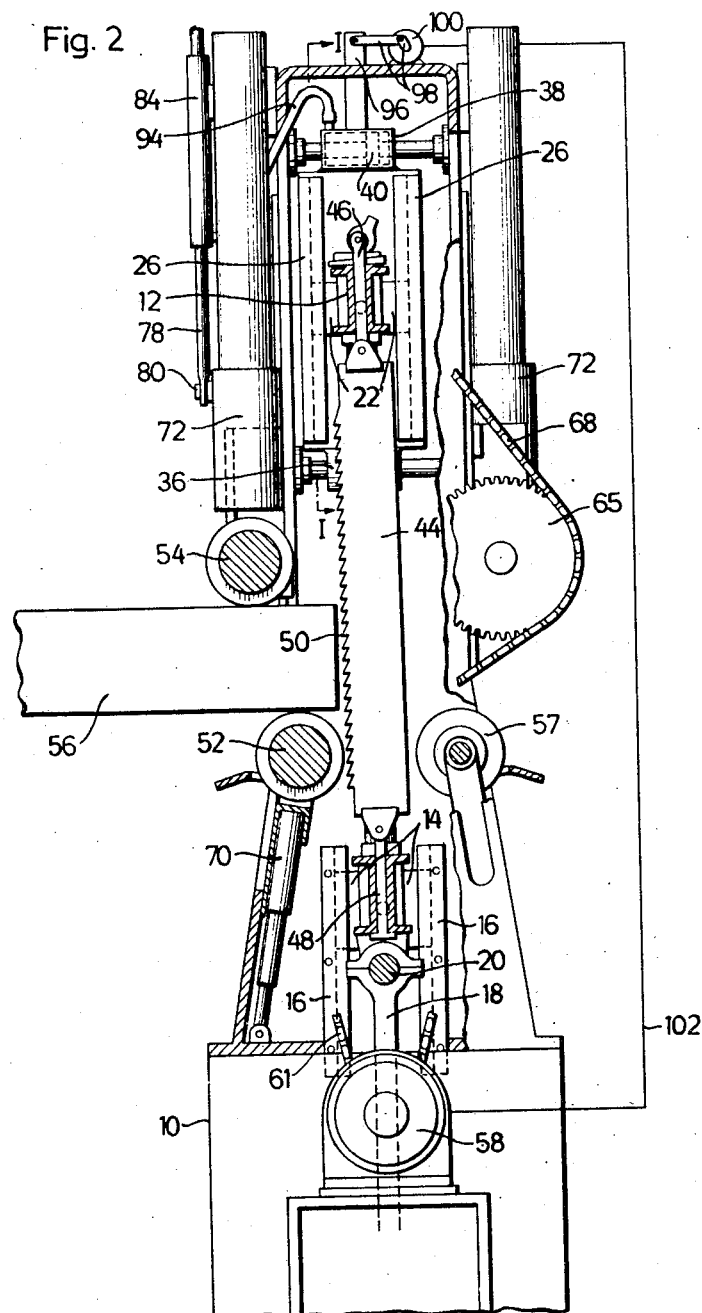

# 2,788,033

AUTOMATICALLY ADJUSTABLE GANG SAW

Arne Alvar von Sneidern, Johanneshov, Sweden, assignor to Soderhamns Verkstader AB, Soderhamn, Sweden, a joint-stock company of Sweden Application December 28, 1954, Serial No. 478,035

Claims priority, application Sweden January 4, 1954

3 Claims. (Cl. 143—84)

My invention relates to an automatically adjustable gang saw for lengthwise sawing of timber logs.

More particularly my invention relates to a gang saw for lengthwise sawing of timber logs comprising a stationary frame, a sash carrying saw blades and reciprocating upwardly and downwardly between lower and upper guides. The gang saw has further at least one pair of feed rollers advancing the logs and conveniently driven by a motor. The two rollers of the pair are disposed to be kept vertically spaced from one another in response to the thickness of the log.

It is well known in prior art to construct the upper or/and the lower guides so as to be adjustable for the purpose of creating a variable overhang of the saw blades which means that the blades have a small slope relative to the vertical plane so as to permit the teeth thereof to perform a sawing operation during the downward stroke of the sash only while being inoperative during the upward stroke thereof in spite of continuation of the feed of the log. The angle of the overhang is to be the larger the quicker the log is fed.

One main object of my invention is to provide a gang saw having an improved capacity by causing the overhang angle of the saw blades continuously to adjust itself in response to variations in the thickness of the log and its feeding speed depending thereon.

Further objects and advantages of my invention will be apparent from the following description considered in connection with the accompanying drawings which form part of this specification, and of which:

Fig. 2 is a lateral view of the gang saw partly in section taken on line II—II of Fig. 1.

Fig. 3 is a digaram of a control mechanism for operation of the gang saw shown in Figs. 1 and 2.

Figure 1:
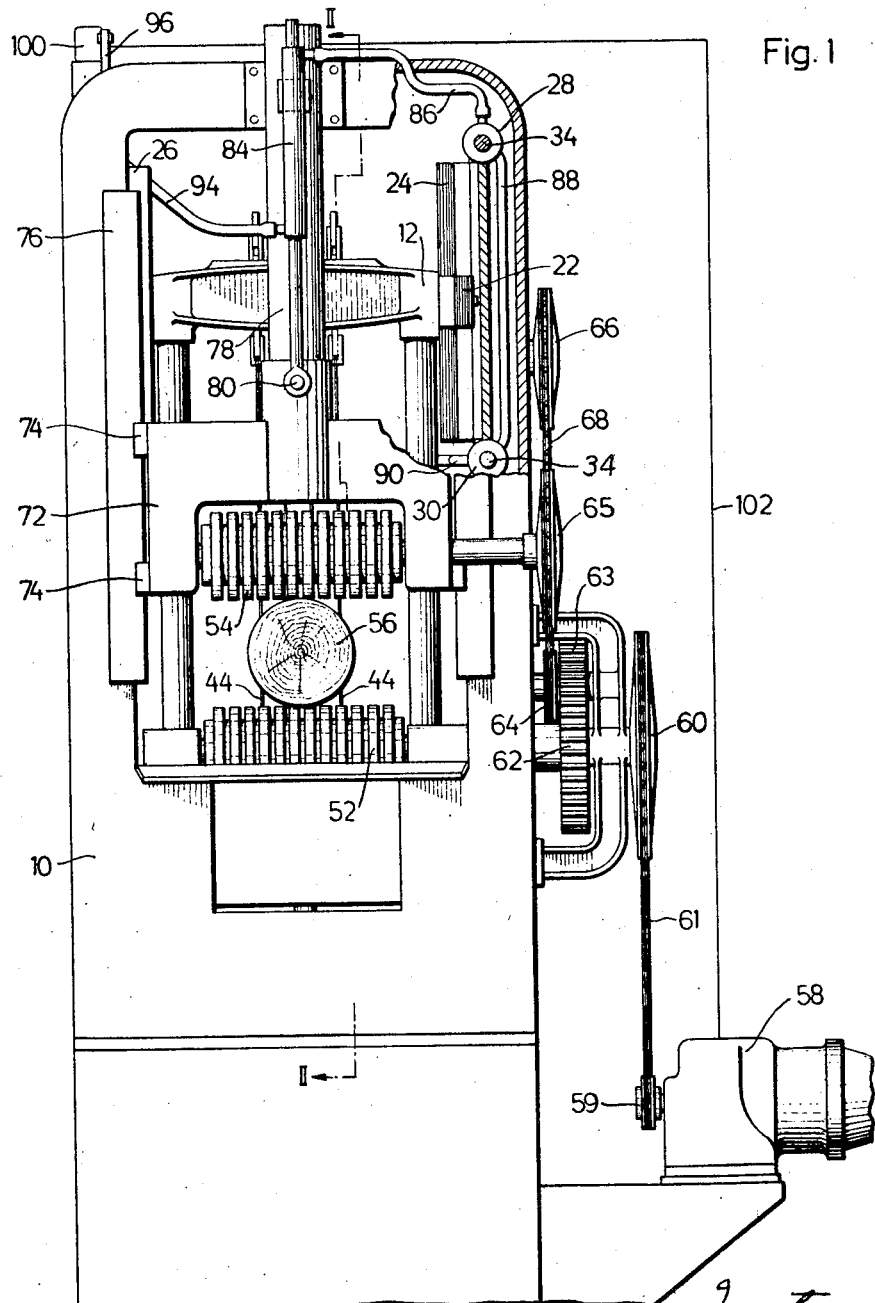
Fig. 1 is a front view of a gang saw constructed according to my invention, seen in the feeding direction of the logs and partly in section taken on line I—I of Fig. 2.

Referring to the drawings, 10 designates the stationary frame of the gang saw. Said stationary frame houses an upwardly and downwardly reciprocating sash 12 of a square shape. At its base the sash is provided with guide blocks 14 sliding along vertical and stationary guides 16. Further a connecting rod 18 driven by a motor (not shown) is journalled on a pivot or wrist pin 20. At its top the sash 12 has two guide blocks 22 sliding along and guided by two pairs of vertical guides 24 and 26, respectively. The guides 24 at their tops and bases are rigidly secured to one another through the cylinders of servomotors 28 and 30, respectively. Each servomotor cylinder encases a piston 32. Each of said pistons 32 is carried by a horizontal spindle 34 rigidly secured to the stationary frame 10. In the same manner each of the guides 26 is connected to the cylinders of servomotors 36 and 38, respectively, each of which encases a piston 40 carried by a horizontal spindle 42 rigidly secured to the stationary frame.

The sash 12 carries a number of saw blades 44, four being shown in the embodiment illustrated, each of which blades at the top and the base is mounted in the sash by means of cross beams or saw buckles 46 and 48, respectively. The cutting teeth 50 of each of the saw blades have an overhang in relation to the timber log to be sawn in order to be capable of impacting said log at a cutting angle automatically accommodating itself to the diameter of the log through the operation of the servomotors 28, 30, 36 and 38 in a manner to be described below in detail.

The gang saw has two superimposed feed rollers 52 and 54, respectively, horizontally mounted in front of the sash and adapted to advance between them the timber log 56 in a direction towards the saw blades 44. A second pair of feed rollers is provided at the rear of the sash, only the lower roller 57 of said pair of rollers being shown in Fig. 2. The rollers are driven by a common motor 58, for example through sprockets 59, 60, a driving chain 61 or the like disposed around said sprockets, intermeshing gears 62, 63 and sprockets 64, 65 and 66 and a chain 68 disposed around said last-mentioned sprockets. This driving device is made in known manner so as to allow vertical displacement of the top rollers in response to the thickness of the timber log. The bottom rollers 52, 57 are disposed so as to be kept in position by means of a telescopic device 70 by means of which said rollers can be lowered so as to make the interior of the machine easily accessible. Said rollers are, however, stationary with respect to their level during operation.

The top feed rollers are supported each by a frame or yoke which by means of shoes or blocks 74 is guided between vertical guideways 76. Mounted on the yoke 72 of the roller 54 is a servomotor-rod 78 pivotable about a wrist pin 80. The rod 78 carries a piston 82 (Fig. 3) sliding displaceable within the stationary cylinder of a servomotor 84. A conduit 86 extends from the top part of the cylinder of said servomotor to the rear part of the housing of the servomotor 28, seen in the feeding direction of the logs. The front part of the servomotor 28 and the rear part of the servomotor 30 are interconnected by means of a conduit 88. Conduits 90 and 92 interconnect in the same manner both sides of the servomotors 30, 36 and 38. A conduit 94 extends from the front part of the servomotor 38 to the base part of the servomotor 84. The servomotors are thus interconnected so as to form a closed system filled with a suitable liquid, such as oil. The liquid may be subjected to atmospheric or an insignificant superatmospheric pressure, inevitable variations of volume due to variations in temperature being equalized by means of a closed expansion vessel (not shown) containing a gas, such as air.

The diameter of the piston 82 is minor and for example one third of that of the pistons 32 and 40. Thus if the piston 82 is displaced for a predetermined distance, the corresponding displacement of the pistons 32 and 40 will be only a fraction thereof. The ratio of transmission may be of the order of magnitude 1:20.

In the embodiment shown an arm 96 is fixed to a part rigidly secured to the guides 24, 26, for example such as the cylinder of one of the servomotors, so as to follow said guides in their horizontal movement. Said movement is transmitted by a system of articulated brackets 98 to a speed control member 100 which in turn through a conduit indicated at 102 actuates the motor 58.

The device according to the invention operates in the following manner. The top roller 54 is assumed to be at the level determined by the diameter of that part of the timber log 56 which is located between the rollers 52 and 54. As mentioned above the saw blades have an overhang relative to the vertical plane in such a manner as to cause the upper portion of the cutting edges 50 to be somewhat less spaced from the log than the lower portion thereof. The sawing operation is performed during the downward stroke of the sash and due to the sloping angle the cutting edges are not in contact with the log during the return stroke of the sash in spite of the continuous advancement of the log. It may further be assumed that the thickness of the log increases during the feed which results in a lifting of the roller 54 by the log. This movement of the roller 54 is followed by the piston 82 of the servomotor 84. The liquid in the hydraulic system will then displace the cylinders of the servomotors 28, 30, 36 and 38 and thereby the guides 24, 26 in such direction as to reduce the overhang angle of the saw blades 44. At the same time the control member 100 actuates the driving motor 58 so as to reduce the speed thereof and thereby that of the feeding movement. If on the other hand the diameter of the log decreases, an actuation takes place in the opposite direction which results in an increase of the overhang angle and the number of revolutions of the motor 58.

Between the driving motor and the feed rollers there may be applied a transmission without stages, for example a hydraulic one, which at a constant number of revolutions of the motor varies the ratio of transmission and thereby the feeding speed of the rollers in response to the height position of the roller 54.

While one more or less specific embodiment of my invention has been described, it is to be understood that this is for the purpose of illustration only and that my invention is not to be limited thereby, but its scope to be determined by the appended claims.

What I claim is:

1. In a gang saw comprising a stationary frame, a movable sash carrying saw blades, upper and lower guides in said stationary frame, means to reciprocate said sash between said guides, at least one pair of driven feed rollers for timber logs, means to accommodate the vertical spacing of said feed rollers to the thickness of the log, one of said guides being adjustable by means of a control device to create a variable overhang of said saw blades, said control device including a plurality of hydraulic servomotors each comprising a cylinder and a piston, the cylinders of a group of said servomotors being connected to said guides and the pistons thereof being rigidly secured to said stationary frame, an additional servomotor, means to actuate said servomotor in accordance with change in the thickness of the log, conduits opening into the cylinders of said servomotors on either side of the pistons, said conduits connecting the servomotors of said group as well as said additional servomotor in series to form a closed system.

2. In a gang saw as claimed in claim 1, the piston of said additional servomotor being connected to said means to accommodate the spacing of said feed rollers.

3. In a gang saw as claimed in claim 1, the diameter of the piston of said lastmentioned servomotor being less than that of the pistons of the other servomotors in said closed system.

References Cited in the file of this patent
UNITED STATES PATENTS

| | | |
|---|---|---|
| 1,002,675 | Graham | Sept. 5, 1911 |

FOREIGN PATENTS

| | | |
|---|---|---|
| 44,575 | Austria | Oct. 25, 1910 |
| 21,724 | Norway | Oct. 2, 1911 |
| 658,052 | Germany | Sept. 2, 1938 |